(12) United States Patent
Farrow et al.

(10) Patent No.: US 9,952,635 B2
(45) Date of Patent: Apr. 24, 2018

(54) COMPUTER BOARD LOCATING MECHANISM

(71) Applicant: Lenovo (Singapore) Pte. Ltd., Singapore (SG)

(72) Inventors: Timothy Samuel Farrow, Cary, NC (US); Ali Kathryn Ent, Garner, NC (US); Shuang Li, Shenzhen (CN); Albert Vincent Makley, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 312 days.

(21) Appl. No.: 14/229,885

(22) Filed: Mar. 29, 2014

(65) Prior Publication Data

US 2015/0277513 A1    Oct. 1, 2015

(51) Int. Cl.
    *G06F 1/18*    (2006.01)

(52) U.S. Cl.
    CPC .............. *G06F 1/184* (2013.01); *G06F 1/181* (2013.01)

(58) Field of Classification Search
    CPC ..... G06F 1/1616–1/1632; G06F 1/181–1/187; G11B 33/127–33/128; H05K 1/00–1/0236; H05K 1/18–1/189
    USPC ....... 361/724–776, 715–722, 679.31–679.45
    See application file for complete search history.

(56) References Cited

U.S. PATENT DOCUMENTS

| | | | | |
|---|---|---|---|---|
| 4,763,300 A * | 8/1988 | Yukawa | ................. | G06F 1/183 273/148 B |
| 5,907,354 A * | 5/1999 | Cama | ................. | G11B 31/006 348/231.7 |
| 6,125,034 A * | 9/2000 | Bovio | ................. | G06F 1/1616 361/679.32 |
| 6,362,978 B1 * | 3/2002 | Boe | ................. | G06F 1/184 248/65 |
| 6,398,325 B1 * | 6/2002 | Chen | ................. | G06F 1/181 292/128 |
| 6,781,055 B2 * | 8/2004 | Chen | ................. | H05K 7/142 174/535 |
| 6,798,669 B1 * | 9/2004 | Hsu | ................. | H05K 7/142 361/726 |
| 7,004,764 B2 * | 2/2006 | Boudreau | ............. | H05K 7/142 174/138 G |
| 7,430,129 B1 * | 9/2008 | Peng | ................. | H05K 7/142 174/138 E |
| 7,535,731 B2 * | 5/2009 | Peng | ................. | G06F 1/184 361/801 |
| 7,876,569 B2 * | 1/2011 | Xue | ................. | G06F 1/184 361/732 |
| 7,921,516 B2 * | 4/2011 | Chuan | ................. | G06F 1/1601 16/239 |

(Continued)

*Primary Examiner* — Dion R Ferguson
*Assistant Examiner* — Amir Jalali
(74) *Attorney, Agent, or Firm* — Brian J. Pangrle

(57) ABSTRACT

A system can include a base that includes a bracket; a board releasably coupled to the base where the board includes at least one processor; and a stop pivotably coupled to the bracket where the stop includes a pivoted orientation that forms a first clearance between the stop and the board that permits movement of the board with respect to the base by a release distance and a stop orientation that limits movement of the board with respect to the base to a distance less than the release distance. Various other apparatuses, systems, methods, etc., are also disclosed.

20 Claims, 8 Drawing Sheets

(56) References Cited

U.S. PATENT DOCUMENTS

| | | | |
|---|---|---|---|
| 8,929,088 B2* | 1/2015 | Ma | H05K 7/142 |
| | | | 174/138 E |
| 2004/0037048 A1* | 2/2004 | Liao | H05K 7/1409 |
| | | | 361/726 |
| 2004/0207988 A1* | 10/2004 | Branch | H05K 7/1428 |
| | | | 361/728 |
| 2005/0152106 A1* | 7/2005 | Coster | G06F 1/181 |
| | | | 361/679.58 |
| 2007/0242442 A1* | 10/2007 | Dai | H05K 7/1408 |
| | | | 361/801 |
| 2007/0258195 A1* | 11/2007 | Liu | G06F 1/185 |
| | | | 361/679.34 |
| 2007/0274034 A1* | 11/2007 | Yang | G06F 1/187 |
| | | | 361/679.39 |
| 2011/0043986 A1* | 2/2011 | Conn | H05K 7/1492 |
| | | | 361/679.02 |
| 2012/0057306 A1* | 3/2012 | Liu | G06F 1/185 |
| | | | 361/726 |
| 2013/0167366 A1* | 7/2013 | Lu | G06F 1/184 |
| | | | 29/700 |
| 2013/0222992 A1* | 8/2013 | Wilke | H05K 3/22 |
| | | | 361/679.4 |
| 2014/0070064 A1* | 3/2014 | Chen | A47B 88/044 |
| | | | 248/221.11 |
| 2015/0282377 A1* | 10/2015 | Hilburn | H05K 7/1488 |
| | | | 248/213.2 |

* cited by examiner

US 9,952,635 B2

COMPUTER BOARD LOCATING MECHANISM

TECHNICAL FIELD

Subject matter disclosed herein generally relates to technology for a computing system.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

A computing system can include various components such as a processor, memory and one or more storage devices. Various components of a computing system may be carried by a board. For example, consider a motherboard that may carry one or more processors. A computing system may include a chassis where a board may be coupled to the chassis. Various examples of technologies, techniques, etc. described herein pertain to one or more mechanisms that may, for example, locate a board.

SUMMARY

A system can include a base that includes a bracket; a board releasably coupled to the base where the board includes at least one processor; and a stop pivotably coupled to the bracket where the stop includes a pivoted orientation that forms a first clearance between the stop and the board that permits movement of the board with respect to the base by a release distance and a stop orientation that limits movement of the board with respect to the base to a distance less than the release distance. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
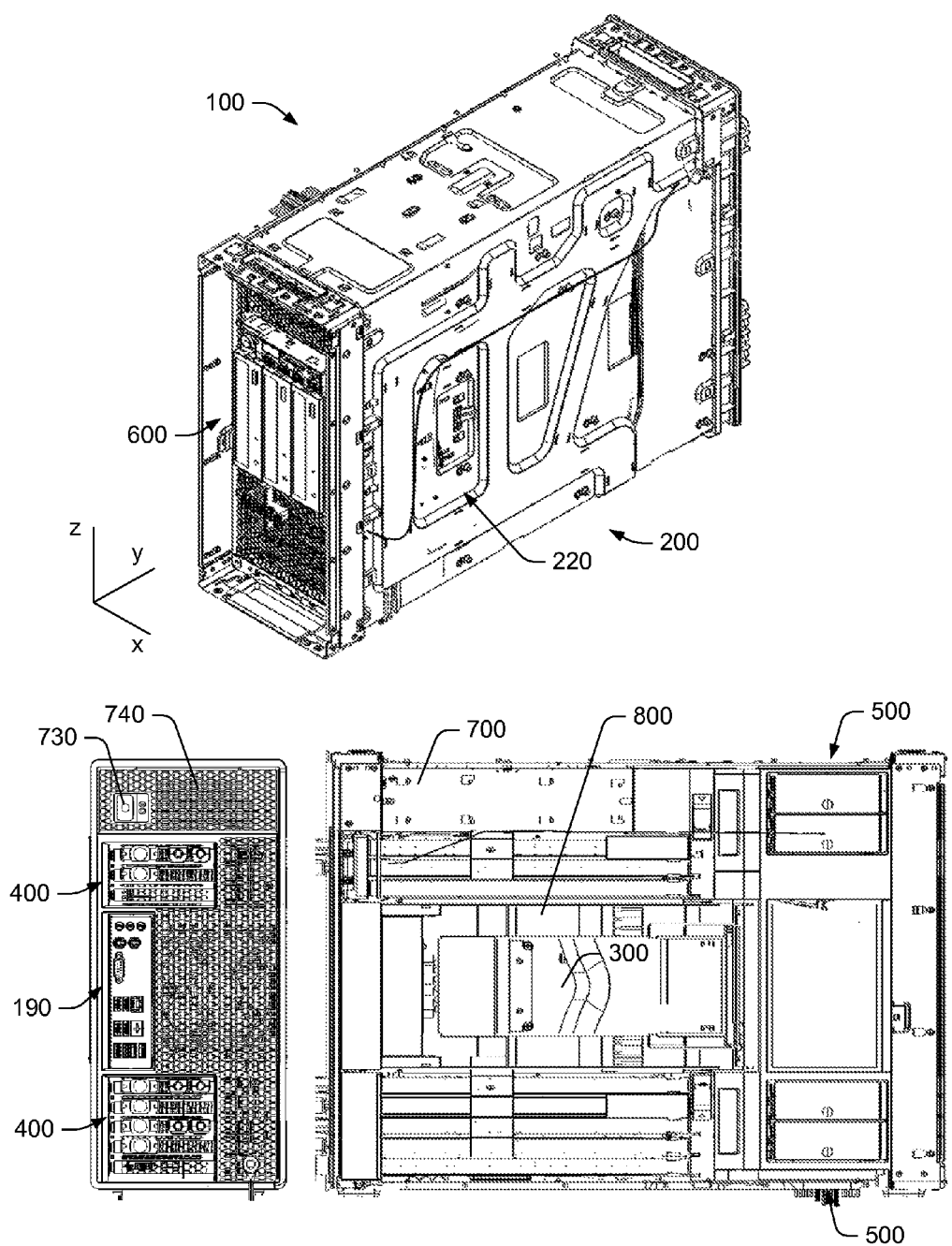
FIG. 1 is a series of diagrams of views of an example of a computing system.

FIG. 1 shows an example of a computing system 100. As an example, the computing system 100 may be a workstation, for example, configured to handle information, which may include one or more of processing information, storing information, receiving information and transmitting information. The computing system 100 can include connectors 190, for example, to connect the computing system 100 to one or more peripherals, networks, etc. As an example, the computing system 100 may include wireless circuitry for wireless connection to one or more peripherals, networks, etc.

As shown in the example of FIG. 1, the computing system includes 100 includes a chassis 200, a board 300, slots 400, bays 500, bays 600, a power supply unit 700 and air flow features 800. As an example, a cover may be fitted to the chassis 200, which may include one or more panels. As an example, a panel may be a lockable panel where, in an unlocked state, it may be removed for access to various components in the computing system 100. As an example, various components may be configured for tool-less installation and removal. As an example, a tool-less configuration may include one or more handles, grips, buttons, levers, etc. that may be manipulated by one or more fingers of a human hand (e.g., or hands). As an example, a tool-less configuration may include guides, for example, for sliding in and sliding out components with respect to the chassis 200.

In the example of FIG. 1, the computing system 100 is shown with respect to a Cartesian coordinate system (x, y, z) and as including a back end and a front end disposed substantially in respective x,z-planes, a top end and a bottom end disposed substantially in respective x,y-planes and a left side and a right side disposed substantially in respective y,z-planes. As to an orientation with respect to gravity, as an example, the computing system 100 may be oriented on its bottom end where gravity may be aligned with the z-axis or, for example, the computing system 100 may be oriented on one of its sides where gravity may be aligned with the x-axis (e.g., with the left side facing upward and the right side facing downward).

In the example of FIG. 1, the chassis 200 includes a mechanism for limiting movement of the board 300 (e.g., at least along the y-axis). As shown, the board 300 may be positioned substantially in a y,z-plane and may include various slots 400 for receipt of one or more components (e.g., cards, etc.), which may extend outwardly from the board 300 (e.g., at least in part along the x-axis).

As to the bays 500 and the bays 600, these may be defined at least in part by the chassis 200. As shown, the bays 500 and the bays 600 may include one or more bays accessible via the front end of the computing system 100 (see, e.g., the bays 600) and may include one or more bays accessible via one or both of the sides of the computing system 100 such as, for example, the left side of the computing system 100 (see, e.g., the bays 500).

In the example of FIG. 1, the computing system 100 includes the power supply unit 700, which includes a connector 730 for receipt of power (e.g., via a power cord) and which may include a fan 740 (e.g., or fans). The power supply unit 700 may provide power to various components of the computing system 100.

As shown in the example of FIG. 1, the chassis 200 includes various openings that may facilitate flow of air. In operation, the front end and the back end of the computing system 100 may be positioned with respective clearances from other environmental structures (e.g., shelves, desks, walls, equipment, etc.), for example, to not unduly hinder flow of air. Air flow through the computing system 100 may be guided by one or more of the air flow features 800. As an example, the computing system 100 may include one or more baffles. As an example, the computing system 100 may include one or more fans. As an example, fans may be operated in series, for example, where air moved by one fan includes air moved by another fan. For example, a fan disposed in a first x,z-plane of the computing system 100 may move air at least in part along the y-axis (e.g., into the computing system 100) where another fan disposed in a second x,z-plane of the computing system 100 receives at least a portion of that air and moves it at least in part along the y-axis (e.g., out of the computing system 100). As mentioned, the power supply assembly 700 may include the fan 740 (e.g., or fans).

In the example of FIG. 1, the board 300 of the computing system 100 can include one or more processors and memory accessible by at least one of the one or more processors. One or more of the bays 500 and/or the bays 600 of the computing system 100 may include one or more storage devices, which may be accessible by at least one of the one or more processors.

A computing system may include a board that is coupled to a chassis via a plurality of screws, which may number over a dozen. In such an example, installation and removal of the board requires screwing and unscrewing the screws using a tool (e.g., a screwdriver). Screwing or unscrewing such a number of screws may be time consuming and, for example, screws may be dropped, misplaced, etc., possibly in a manner that could damage or potentially damage one or more components of a computing system (e.g., consider electrical shorting due to loose screws made of electrically conductive material).

As an example, the computing system 100 of FIG. 1 may include a mechanism or mechanisms that can couple and decouple the board 300 from the chassis 200, optionally without screwing and unscrewing screws. As an example, the computing system 100 of FIG. 1 may include a tool-less mechanism, for example, where manipulation of one or more components by hand may allow for installation and removal of the board 300 from the chassis 200.

As an example, a computing system may include a pivotable element mechanism (PEM) that is coupled to a motherboard where the motherboard includes ball heads that engage into keyhole slots to support the motherboard in a chassis. Such a mechanism may retain the motherboard in a desired location, for example, during shipping and general use. As an example, a mechanism may be a locating mechanism, for example, that may limit movement of a board with respect to a chassis.

As an example, a locating mechanism may include a spring loaded plane that may be displaced when a board is installed. In such an example, to remove the board, the plane may be pushed downward (e.g., out of the way) to thereby allow for movement of and release of the board (e.g., from a chassis).

Figure 2:
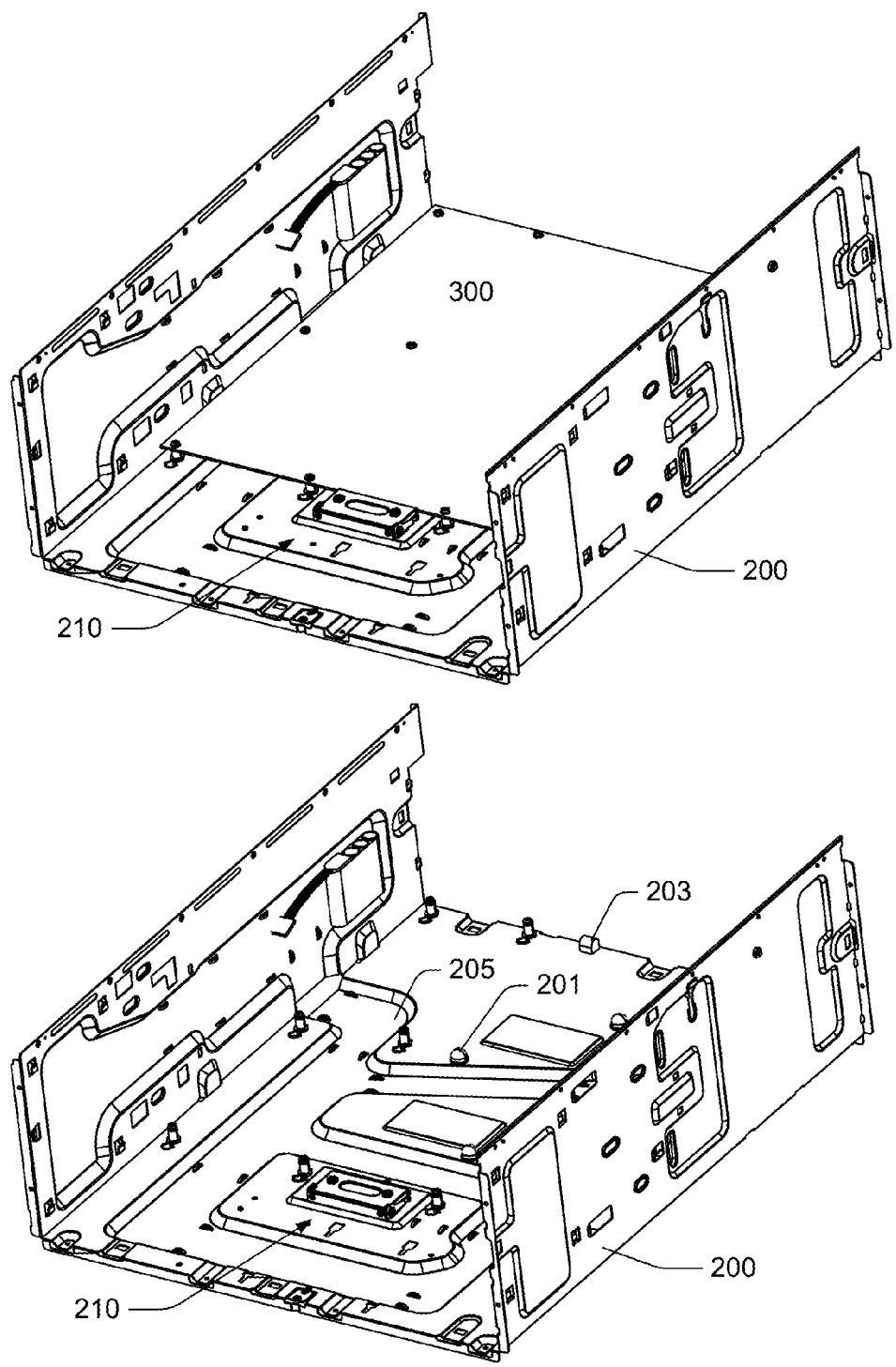
FIG. 2 is a series of diagrams of views of an example of an assembly that includes a chassis and a locating mechanism for a board.

FIG. 2 shows a perspective view of the chassis 200 with an example of a mechanism 210 for locating the board 300. As shown, the chassis 200 may include various features. For example, the chassis 200 may include spacers 201 and 203 and may include recesses 205 that may receive cables, etc. that may operatively couple various components carried by the chassis 200. As an example, spacers 201 and 203 may be resilient (e.g., rubber, elastomeric, etc.) to absorb energy (e.g., shock, vibration, etc.). As an example, the spacers 201 and 203 may be non-conductive (e.g., electrically insulating). As an example, the chassis 200 may include a base portion and optionally one or more walls that extend from the base portion.

As shown in the example of FIG. 2, the board 300 may be rectangular and the chassis 200 may include a U-shaped cross-section (e.g., formed via a base portion and walls, etc.). As mentioned, the board 300 may include one or more sockets, etc. for receipt of one or more processors. In a computing system, various components may be operatively coupled to one or more processors. As an example, a processor may be positioned via a board that is received by a chassis in a manner that allows for making connections, for example, by installing components with respect to the chassis. For example, the board may be mounted orthogonally to one or more bays that may be configured to receive drives, a power supply unit, etc. As an example, a component may be received by a bay of a chassis and may include a connector that couples to a connector mounted to the board. In such an example, the location of the board in the chassis may be assured at least in part via a mechanism such as the mechanism 210.

Figure 3:
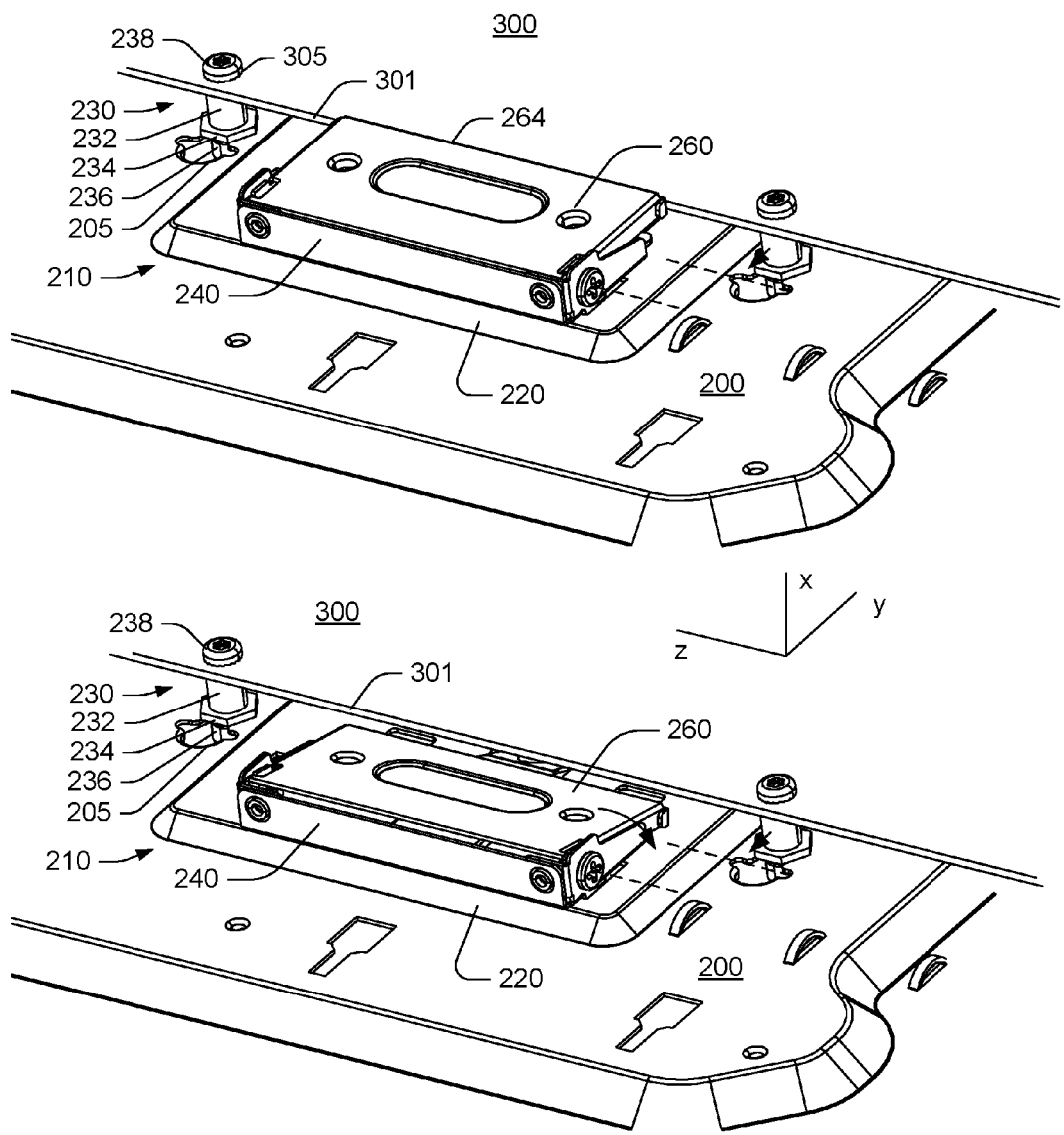
FIG. 3 is a series of diagrams of views of an example of an assembly that includes a chassis and a locating mechanism for a board.

FIG. 3 shows a perspective view of the mechanism 210 in a first orientation and a perspective view of the mechanism 210 in a second orientation. In the example of FIG. 3, the second orientation may be referred to as a pivoted orientation that may allow for movement of the board 300 with respect to the chassis 200; whereas, the first orientation may be referred to as a stop orientation that limits movement of the board 300 with respect to the chassis 200.

In the example of FIG. 3, the mechanism 210 includes a mount 220, a bracket 240 and a stop 260. Another mechanism 230 is shown as being configured to couple the board 300 to the chassis 200. The mechanism 230 includes a post 232 that is mounted between a washer nut 234 and a screw 238 as well as a nut 236 that is mounted below the washer nut 234. As shown, the chassis 200 includes a slot 205 and the board 300 includes an opening 305. In the example of FIG. 3, the mechanism 230 may be coupled to the board 300, for example, by positioning the post 232 on one side of the opening 305 of the board 300 and by passing the screw 238 through the opening 305 and screwing the screw 238 into the post 232, which may include threads that match threads of the screw 238, which may be a bolt, a machine screw, etc. As an example, the washer nut 234 may be adjusted with respect to the nut 236 to match a thickness of the chassis 200 about at least a portion of the slot 205. As an example, the mechanism 230, as attached to the board 300, may be received via an end through the slot 205 of the chassis 200 and then translated in the slot 205. As an example, translation may be along a y-direction and may be limited to a translation distance sufficient to position the nut 236 at an enlarged portion of the slot 205 that permits passage of the nut 236 through the enlarged portion of the slot 205.

As shown in FIG. 3, the board 300 includes an edge 301. As an example, the board 300 may be biased by one or more biasing mechanisms, optionally in a direction such as the y-direction. Where such biasing force is applied to the board 300, the edge 301 of the board 300 may form a contact with the stop 260 of the mechanism 210 when the stop 260 is in a stop orientation. As an example, where such force is not applied to the board 300 in a manner that causes the edge 301 of the board 300 to contact a surface 264 of the stop 260, a clearance may exist between the surface 264 of the stop 260 and the edge 301 of the board 300. Such a clearance may allow for pivoting of the stop 260 in a manner that clears the edge 301 of the board 300.

As an example, where the board 300 is biased, force may optionally be applied to move the board 300 (e.g., in the y-direction) to create a clearance between the edge 301 of the board 300 and the surface 264 of the stop 260. In such an example, the stop 260 may be pressed to pivot it to the pivoted orientation and the biasing force applied to the board 300 may act to translate the board 300, for example, over the top of the stop 260 (e.g., past the surface 264). As an example, a person may apply force to the board 300 to translate it for installation or removal.

Figure 4:
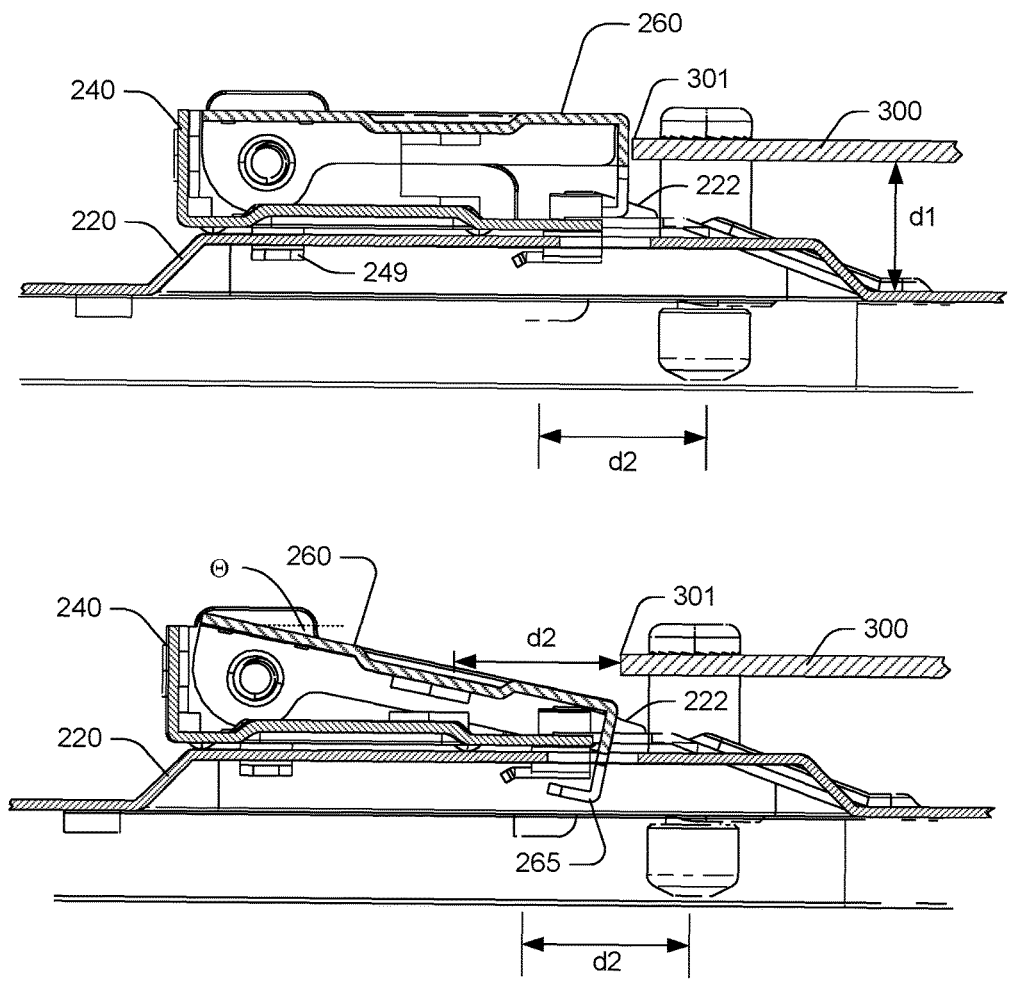
FIG. 4 is a series of diagrams of cutaway views of an example of an assembly that includes a chassis and a locating mechanism.

FIG. 4 shows cutaway views of the mechanism 210 in a stop orientation and in a pivoted orientation. In the views of FIG. 4, various dimensions d1 and d2 and Θ, are shown such as, for example, a distance d1 from the chassis 200 to the board 300, a release distance d2 for the mechanism 230 as mounted to the board 300 with respect to the chassis 200, and an angle of pivot Θ for the stop 260 with respect to the bracket 240 (e.g., about a pivot axis). In the stop orientation example of FIG. 4, a clearance is shown between the surface 264 (see FIG. 3) of the stop 260 and the edge 301 of the board 300.

In the example of FIG. 4, the stop 260 includes a prong 265 that can pivot with the stop 260, for example, through an opening of the mount 220. As shown, the mount 220 can have a mount height defined by a position of a base portion and a position of a platform portion where, for example, the prong 265 upon pivoting does not extend to the position of the base portion. In such an example, the mount 220 may include a stop 222 that limits pivoting of the stop 260 with respect to the bracket 240 and the mount 220. In such an example, a panel, a component, a cable, etc. may be positioned below the chassis 200 and the stop 222 may prohibit contact therewith by the prong 265 in the pivoted orientation of the stop 260.

As an example, the bracket 240 may be coupled to the mount 220 via one or more prongs and, for example, via a flexible tongue of the mount 220. In the example of FIG. 4, the stop 222 is a portion of a tongue of the mount 220 and the prong 249 is portion of the bracket 240.

Figure 5:
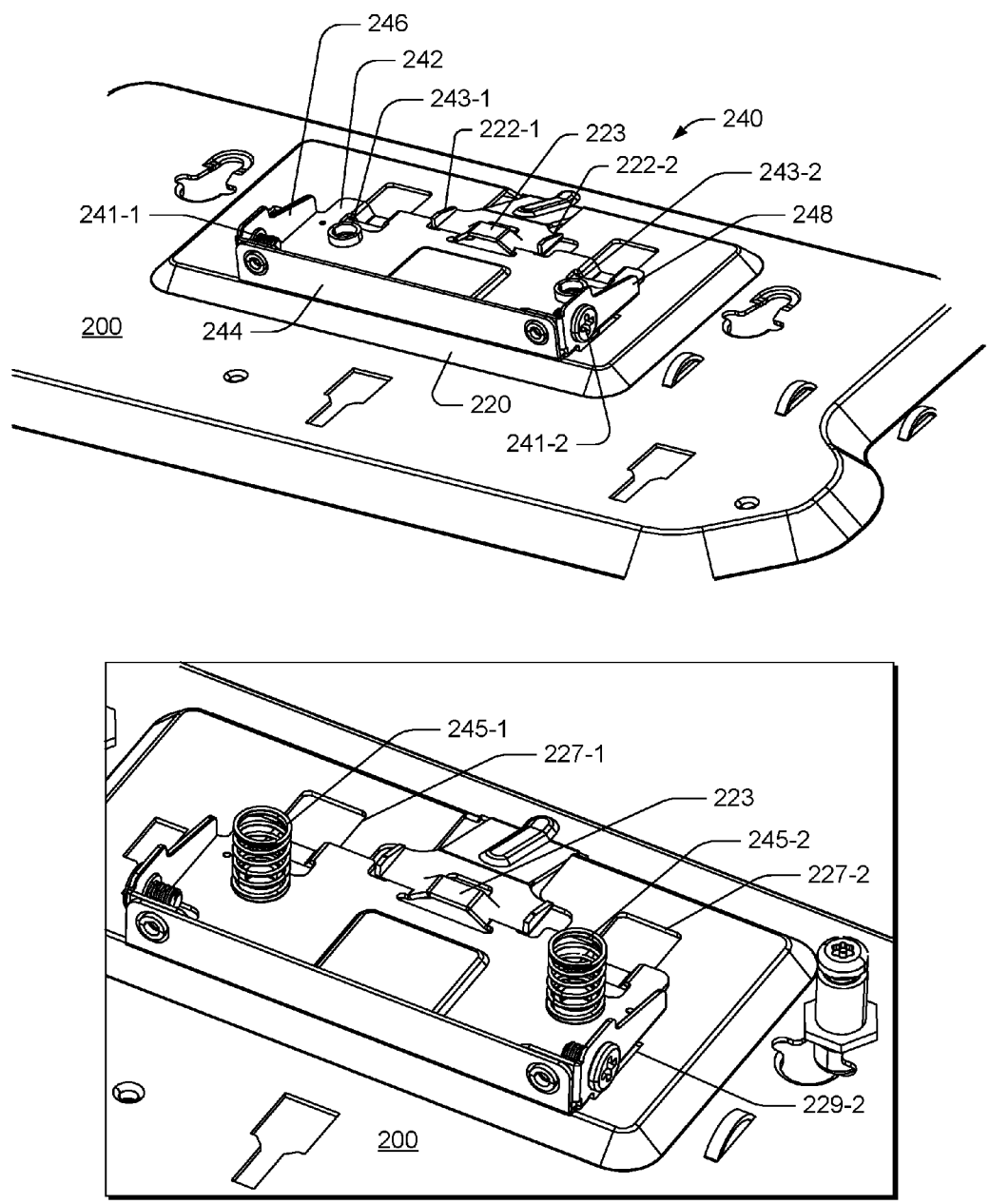
FIG. 5 is a series of diagrams of views of an example of an assembly that includes a mount and a bracket.

FIG. 5 shows perspective views of the bracket 240 as operatively coupled to the chassis 200 via the mount 220. As an example, the bracket 240 may be attachable to the mount 220 in a tool-less process. For example, the bracket 240 may clip to the mount 220.

As shown in FIG. 5, the mount 220 may include stops 222-1 and 222-2 as portions of a flexible tongue, which may be, for example, a portion of chassis 200 (e.g., formed via stamping, etc.), the mount 220 may include openings 227-1 and 227-2 and may include slots 229-1 and 229-2 (not shown). Such features of the mount 220 may intercooperate with features of the bracket 240. For example, the prong 249 shown in FIG. 4 may be a first prong 249-1 and the bracket 240 may include a second prong 249-2. Such prongs may be received via the slots 229-1 and 229-2 (not shown), respectively, and additional prongs may be received via the openings 227-1 and 227-2. As an example, a tongue may be received with respect to one or more features of the bracket 240, for example, in a manner that the tongue exerts a biasing force that biases the bracket 240 to the mount 220.

As shown in FIG. 5, the bracket 240 can include pivot axels 241-1 and 241-2, a base 242, a back portion 244, a side support 246 for the pivot axel 241-1, and a side support 248 for the pivot axel 241-2. As shown, the bracket 240 can include fixtures 243-1 and 243-2 that may receive springs 245-1 and 245-2. The spring 245-1 and 245-2 may bias the stop 260 in a stop orientation. For example, the tongue of the mount 220 can include a stop 223 that can restrain the stop 260 via contact with the prong 265 of the stop 260 (see, e.g., FIG. 4).

Figure 6:
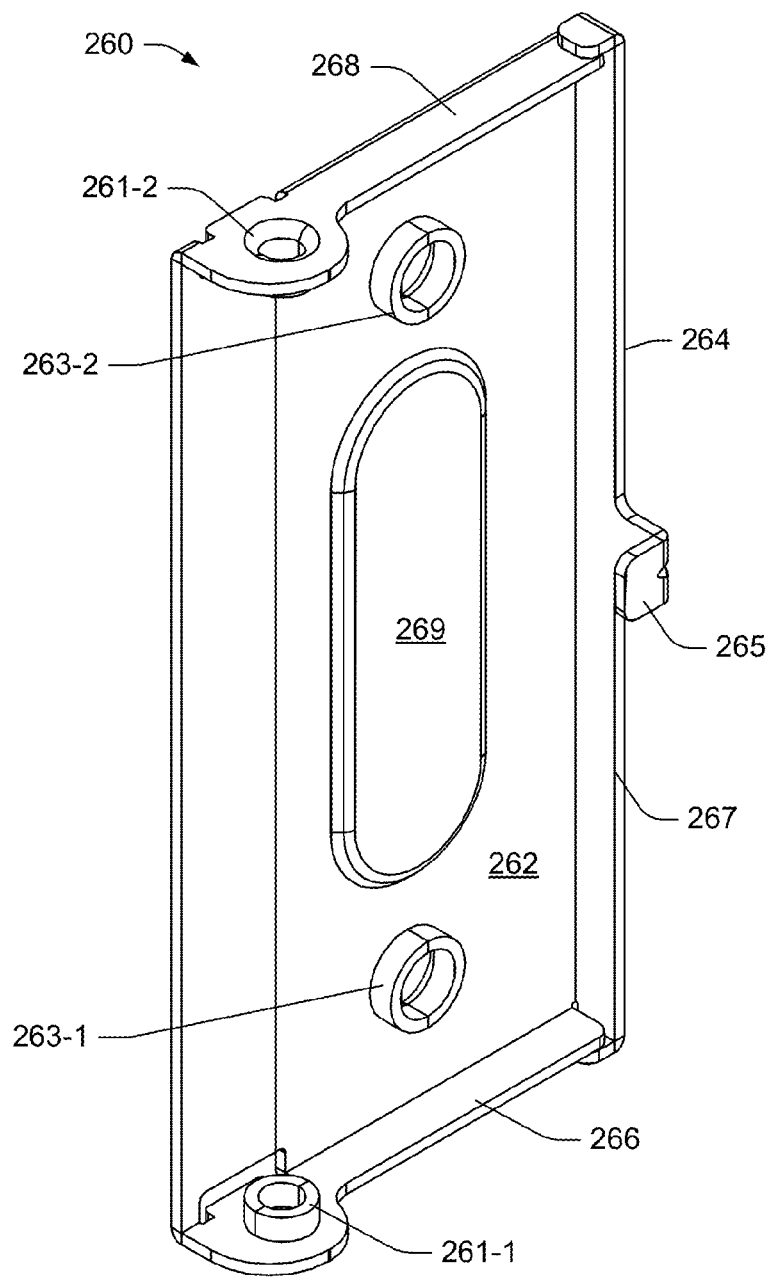
FIG. 6 is a diagram of a perspective view of an example of a stop.

FIG. 6 shows a perspective view of the stop 260. As shown in the example of FIG. 6, the stop 260 can include bushings 261-1 and 261-2 for pivot axels, a plate portion 262, fixtures 263-1 and 263-2, wall portions 266, 267 and 268, and a recessed portion 269 that is recessed with respect to the plate portion 262. The prong 265 is shown in the example of FIG. 6 as extending from the wall portion 267, which includes the surface 264. As mentioned, as an example, the prong 265 may act as a catch with respect to the stop 223 of the tongue portion of the mount 220. The bushings 261-1 and 261-2 may receive the axels 241-1 and 241-2 of the bracket 240, which may be insertable into the bracket 240 (e.g., as screws, machine screws, bolts, etc.). As an example, the axels 241-1 and 241-2 may allow for assembly and disassembly of the stop 260 with respect to the bracket 240.

Figure 7:
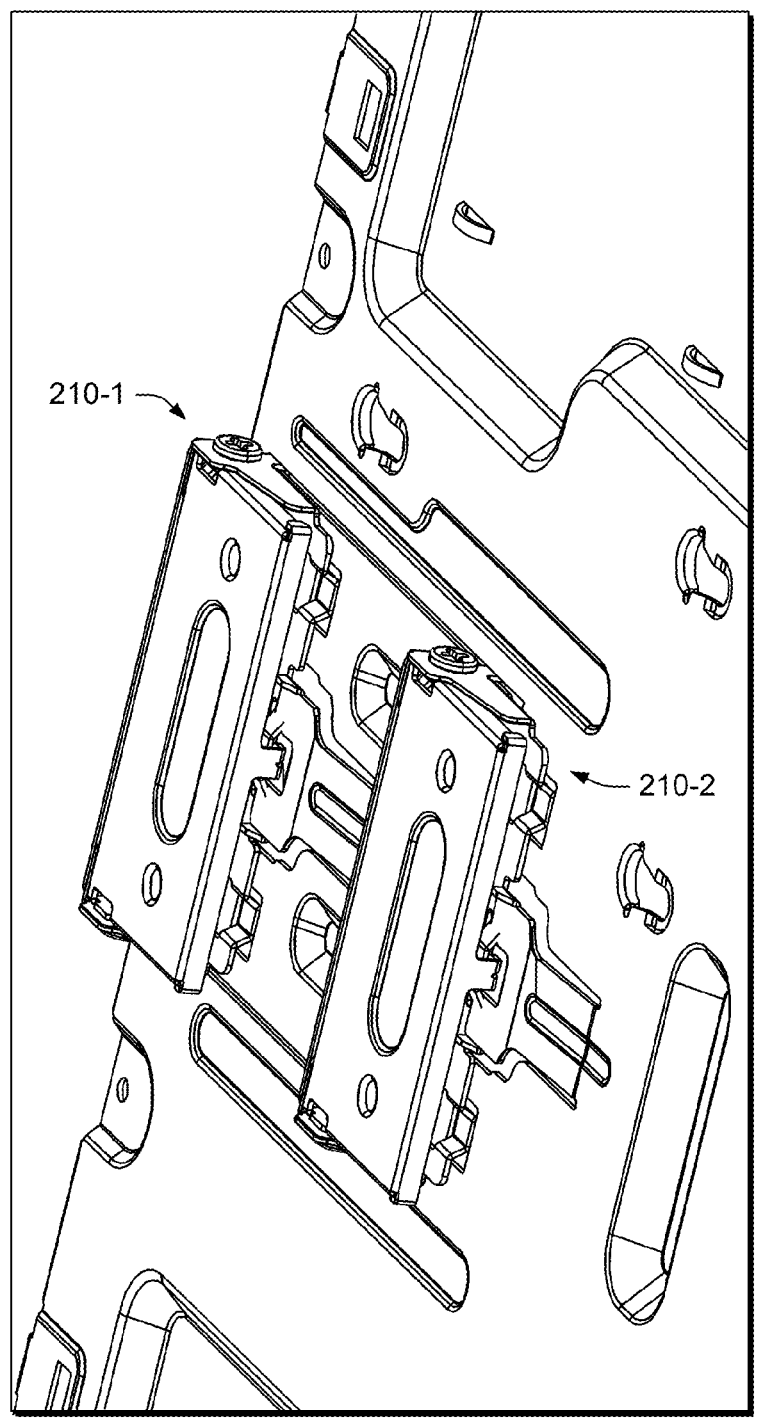
FIG. 7 is a diagram of a perspective view of a portion of an assembly that includes two mounts for at least one locating mechanism.

FIG. 7 shows an example of an assembly that may include one or more mounts for one or more mechanisms 210-1 and 210-2 As an example, such an arrangement may allow for selection of a board with a first dimension or for selection of a board with a second dimension that exceeds the first dimension.

As an example, a system can include a base that includes a bracket; a board releasably coupled to the base where the board includes at least one processor; and a stop pivotably coupled to the bracket where the stop includes a pivoted orientation that forms a first clearance between the stop and the board that permits movement of the board with respect to the base by a release distance and a stop orientation that limits movement of the board with respect to the base to a distance less than the release distance. As an example, the base may be a portion of a chassis of a computing system.

As an example, a system may include a coupling mechanism that releasably couples a board and a base. As an example, a system may include a first clearance between a stop and a board that permits translation of the board with respect to the base by a release distance. In such an example, the release distance may be associated with a coupling mechanism. As an example, a system may include, in a pivoted orientation of a stop, a first clearance between the stop and a board that allows for translation of the board a release distance and, in a stop orientation of the stop, a second clearance where the second clearance limits translation of the board with respect to a base to a distance that is less than the release distance. As an example, a system may include a biasing mechanism that biases a stop in a stop orientation.

As an example, a system may include posts and slots that releasably couple a board to a base. In such an example, the base may include at least a portion of the slots where at least a portion of the posts are mounted to the board. As an example, where a system includes posts and slots, a board may include at least a portion of slots where at least a portion of the posts are mounted to a base. As an example, posts may be translatable with respect to slots.

As an example, a system may include a board that includes an edge where a stop includes a surface and where a distance associated with a clearance is between the edge and the surface (e.g., in a stop orientation of the stop). As an example, a stop may include a pivot axis where, in a stop orientation, the stop is oriented at a stop angle defined with respect to the pivot axis and where, in the pivoted orientation, the stop is oriented at a pivoted angle defined with respect to the pivot axis. As an example, the difference between the stop angle and the pivoted angle may be approximately at least 10 degrees.

As an example, a bracket may be clipped to a base where the base may be, for example, a portion of a chassis. As an example, a bracket may include an extension and a base may include an opening that receives the extension and that forms a biased contact between the bracket and the base.

As an example, a system may include a base that includes at least two mounts and, for example, a bracket that is mounted to one of the at least two mounts.

As an example, a base may include an opening where, in a pivoted orientation of a stop, a portion of the stop is received by the opening.

As an example, a base may include a cable recesses that receive one or more cables that are operatively coupled to a board.

As an example, a system can include a processor; memory accessibly by the processor; a board, the processor and the memory being mounted to the board; a storage device; a chassis that includes a bracket, the board and the storage device being releasably coupled to the chassis; and a stop pivotably coupled to the bracket where the stop includes a pivoted orientation that forms a first clearance between the stop and the board that permits movement of the board with respect to the chassis by a release distance and a stop orientation that limits movement of the board with respect to the chassis to a distance less than the release distance. In such an example, the system may include a power supply unit releasably coupled to the chassis. As an example, a system may include tool-less coupling mechanisms that include a tool-less coupling mechanism that couples a storage device to a chassis and a tool-less coupling mechanism that couples a bracket to the chassis.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 8:
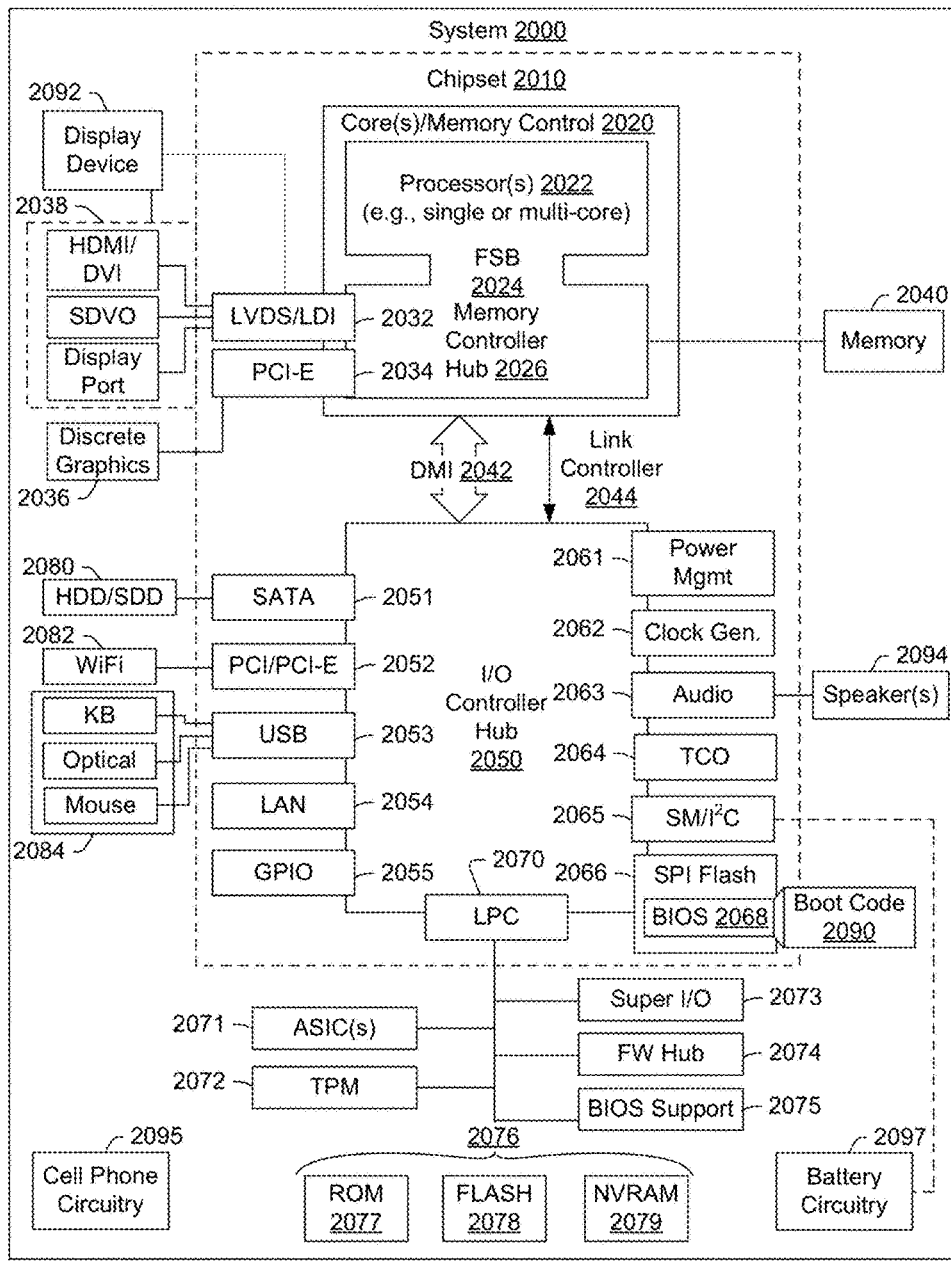
FIG. 8 is a diagram of an example of circuitry of a system, a device, etc.

While various examples of circuits or circuitry may be shown or discussed, FIG. 8 depicts a block diagram of an illustrative computer system 2000. The system 2000 may be a computer system, such as one of the ThinkCentre® or ThinkPad® series of computers sold by Lenovo (US) Inc. of Morrisville, N.C., or a workstation computer, such as the ThinkStation® workstation computer sold by Lenovo (US) Inc. of Morrisville, N.C.; however, as apparent from the description herein, a satellite, a base, a server or other machine may include other features or only some of the features of the system 2000 (e.g., consider the ThinkServer® server sold by Lenovo (US) Inc. of Morrisville, N.C.).

As shown in FIG. 8, the system 2000 includes a so-called chipset 2010. A chipset refers to a group of integrated circuits, or chips, that are designed to work together. Chipsets are usually marketed as a single product (e.g., consider chipsets marketed under the brands INTEL®, AMD®, etc.).

In the example of FIG. 8, the chipset 2010 has a particular architecture, which may vary to some extent depending on brand or manufacturer. The architecture of the chipset 2010 includes a core and memory control group 2020 and an I/O controller hub 2050 that exchange information (e.g., data, signals, commands, etc.) via, for example, a direct management interface or direct media interface (DMI) 2042 or a link controller 2044. In the example of FIG. 8, the DMI 2042 is a chip-to-chip interface (sometimes referred to as being a link between a "northbridge" and a "southbridge").

The core and memory control group 2020 include one or more processors 2022 (e.g., single core or multi-core) and a memory controller hub 2026 that exchange information via a front side bus (FSB) 2024. As described herein, various components of the core and memory control group 2020 may be integrated onto a single processor die, for example, to make a chip that supplants the conventional "northbridge" style architecture.

The memory controller hub 2026 interfaces with memory 2040. For example, the memory controller hub 2026 may provide support for DDR SDRAM memory (e.g., DDR, DDR2, DDR3, etc.). In general, the memory 2040 is a type of random-access memory (RAM). It is often referred to as "system memory".

The memory controller hub 2026 further includes a low-voltage differential signaling interface (LVDS) 2032. The LVDS 2032 may be a so-called LVDS Display Interface (LDI) for support of a display device 2092 (e.g., a CRT, a flat panel, a projector, etc.). A block 2038 includes some examples of technologies that may be supported via the LVDS interface 2032 (e.g., serial digital video, HDMI/DVI, display port). The memory controller hub 2026 also includes one or more PCI-express interfaces (PCI-E) 2034, for example, for support of discrete graphics 2036. Discrete graphics using a PCI-E interface has become an alternative approach to an accelerated graphics port (AGP). For example, the memory controller hub 2026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 2050 includes a variety of interfaces. The example of FIG. 8 includes a SATA interface 2051, one or more PCI-E interfaces 2052 (optionally one or more legacy PCI interfaces), one or more USB interfaces 2053, a LAN interface 2054 (more generally a network interface), a general purpose I/O interface (GPIO) 2055, a low-pin count (LPC) interface 2070, a power management interface 2061, a clock generator interface 2062, an audio interface 2063 (e.g., for speakers 2094), a total cost of operation (TCO) interface 2064, a system management bus interface (e.g., a multi-master serial computer bus interface) 2065, and a serial peripheral flash memory/controller interface (SPI Flash) 2066, which, in the example of FIG. 8, includes BIOS 2068 and boot code 2090. With respect to network connections, the I/O hub controller 2050 may include integrated gigabit Ethernet controller lines multiplexed with a PCI-E interface port. Other network features may operate independent of a PCI-E interface.

The interfaces of the I/O hub controller 2050 provide for communication with various devices, networks, etc. For example, the SATA interface 2051 provides for reading, writing or reading and writing information on one or more drives 2080 such as HDDs, SDDs or a combination thereof. The I/O hub controller 2050 may also include an advanced host controller interface (AHCI) to support one or more drives 2080. The PCI-E interface 2052 allows for wireless connections 2082 to devices, networks, etc. The USB interface 2053 provides for input devices 2084 such as keyboards (KB), one or more optical sensors, mice and various other devices (e.g., microphones, cameras, phones, storage, media players, etc.). On or more other types of sensors may optionally rely on the USB interface 2053 or another interface (e.g., I²C, etc.).

In the example of FIG. 8, the LPC interface 2070 provides for use of one or more ASICs 2071, a trusted platform module (TPM) 2072, a super I/O 2073, a firmware hub 2074, BIOS support 2075 as well as various types of memory 2076 such as ROM 2077, Flash 2078, and non-volatile RAM (NVRAM) 2079. With respect to the TPM 2072, this module may be in the form of a chip that can be used to authenticate software and hardware devices. For example, a TPM may be capable of performing platform authentication and may be used to verify that a system seeking access is the expected system.

The system 2000, upon power on, may be configured to execute boot code 2090 for the BIOS 2068, as stored within the SPI Flash 2066, and thereafter processes data under the control of one or more operating systems and application software (e.g., stored in system memory 2040). An operating system may be stored in any of a variety of locations and accessed, for example, according to instructions of the BIOS 2068. Again, as described herein, a satellite, a base, a server or other machine may include fewer or more features than shown in the system 2000 of FIG. 8. Further, the system 2000 of FIG. 8 is shown as optionally including cell phone circuitry 2095, which may include GSM, CDMA, etc., types of circuitry configured for coordinated operation with one or more of the other features of the system 2000 and battery circuitry 2097.

Conclusion

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
   a chassis that comprises a bracket;
   a board releasably coupled to the chassis wherein the board comprises at least one processor and an edge; and
   a stop pivotably coupled to the bracket wherein the stop comprises
      a planar portion that extends to an end surface,
      a pivoted orientation toward the bracket that forms a first clearance between the planar portion and the edge of the board that permits translation of the board with respect to the chassis toward and over the planar portion by a release distance and
      a stop orientation that limits translation of the board with respect to the chassis toward the end surface to a distance between the edge of the board and the end surface that is less than the release distance.

2. The system of claim 1 comprising a coupling mechanism that releasably couples the board and the chassis.

3. The system of claim 1 wherein the stop orientation forms a second clearance and wherein the second clearance limits translation of the board with respect to the chassis to the distance that is less than the release distance.

4. The system of claim 1 further comprising a biasing mechanism that biases the stop in the stop orientation.

5. The system of claim 1 comprising posts and slots that releasably couple the board to the chassis.

6. The system of claim 5 wherein the chassis comprises at least a portion of the slots and wherein at least a portion of the posts are mounted to the board.

7. The system of claim 5 wherein the board comprises at least a portion of the slots and wherein at least a portion of the posts are mounted to the chassis.

8. The system of claim 5 wherein the posts are translatable with respect to the slots.

9. The system of claim 1 wherein the stop comprises a pivot axis, wherein in the stop orientation, the stop is oriented at a stop angle defined with respect to the pivot axis and wherein, in the pivoted orientation, the stop is oriented at a pivoted angle defined with respect to the pivot axis.

10. The system of claim 9 wherein the difference between the stop angle and the pivoted angle is approximately at least 10 degrees.

11. The system of claim 1 wherein the bracket is clipped to the chassis.

12. The system of claim 1 wherein the bracket comprises an extension and wherein the chassis comprises an opening that receives the extension and that forms a biased contact between the bracket and the chassis.

13. The system of claim 1 wherein the chassis comprises at least two mounts and wherein the bracket is mounted to one of the at least two mounts.

14. The system of claim 1 wherein the chassis comprises an opening and wherein, in the pivoted orientation, a portion of the stop is received by the opening.

15. The system of claim 1 wherein the chassis comprises cable recesses that receive cables that are operatively coupled to the board.

16. A system comprising:
   a processor;
   memory accessibly by the processor;
   a board, the processor and the memory being mounted to the board, wherein the board comprises an edge;
   a storage device;
   a chassis that comprises a bracket, the board and the storage device being releasably coupled to the chassis; and
   a stop pivotably coupled to the bracket wherein the stop comprises a planar portion that extends to an end surface, a pivoted orientation toward the bracket that forms a first clearance between the planar portion and the edge of the board that permits translation of the board with respect to the chassis toward and over the planar portion by a release distance and a stop orientation that limits translation of the board with respect to the chassis toward the end surface to a distance between the edge of the board and the end surface that is less than the release distance.

17. The system of claim 16 further comprising a power supply unit releasably coupled to the chassis.

18. The system of claim 16 further comprising tool-less coupling mechanisms that comprise a tool-less coupling mechanism that couples the storage device to the chassis and a tool-less coupling mechanism that couples the bracket to the chassis.

19. A method comprising:
in a system that comprises a processor; memory accessibly by the processor; a board, the processor and the memory being mounted to the board, wherein the board comprises an edge; a storage device; a chassis that comprises a bracket, the board and the storage device being releasably coupled to the chassis; and a stop pivotably coupled to the bracket wherein the stop comprises a planar portion that extends to an end surface, a pivoted orientation toward the bracket that forms a first clearance between the planar portion and the edge of the board that permits translation of the board with respect to the chassis toward and over the planar portion by a release distance and a stop orientation that limits translation of the board with respect to the chassis toward the end surface to a distance between the edge of the board and the end surface that is less than the release distance, limiting translation of the board with respect to the chassis toward the end surface via the stop.

20. The method of claim 19 comprising pivoting the stop to the pivoted orientation and translating the board with respect to the chassis toward and over the planar portion by the release distance.

* * * * *